(12) United States Patent
Langner et al.

(10) Patent No.: US 8,557,171 B2
(45) Date of Patent: Oct. 15, 2013

(54) METHOD FOR PRODUCING DOPED QUARTZ GLASS

(75) Inventors: Andreas Langner, Freigericht (DE);
Thomas Kayser, Leipzig (DE);
Gerhard Schoetz, Aschaffenburg (DE);
Mario Such, Graefenhainichen (DE);
Johannes Kirchhof, Jena (DE); Stephan Grimm, Jena (DE); Volker Reichel, Jena (DE)

(73) Assignees: Heraeus Quarzglas GmbH & Co. KG, Hanau (DE); Institut fur Photonische Technologien, Jena (DE)

( * ) Notice: Subject to any disclaimer, the term of this patent is extended or adjusted under 35 U.S.C. 154(b) by 418 days.

(21) Appl. No.: 12/679,006

(22) PCT Filed: Sep. 18, 2008

(86) PCT No.: PCT/EP2008/062410
§ 371 (c)(1),
(2), (4) Date: May 25, 2010

(87) PCT Pub. No.: WO2009/040287
PCT Pub. Date: Apr. 2, 2009

(65) Prior Publication Data
US 2010/0251771 A1   Oct. 7, 2010

(30) Foreign Application Priority Data
Sep. 20, 2007  (DE) .......................... 10 2007 045 097

(51) Int. Cl.
*C04B 35/14* (2006.01)
(52) U.S. Cl.
USPC ........................................................ 264/651
(58) Field of Classification Search
USPC ...................................................... 264/651
See application file for complete search history.

(56) References Cited

U.S. PATENT DOCUMENTS 2,645,619 A * 7/1953 Hoekstra ........................ 502/8
3,634,711 A   1/1972 Barber et al.
(Continued)

FOREIGN PATENT DOCUMENTS

| DE | 102004006017 A1 | 7/2005 |
| EP | 0281282 A1 | 9/1988 |
| GB | 1178803 A1 | 1/1970 |
| WO | 2006003253 A1 | 1/2006 |
| WO | 2007017454 A1 | 2/2007 |

OTHER PUBLICATIONS

M. N. Rahaman. Ceramic Processing and Sintering. New York, 1995, pp. 264-272.*

(Continued)

*Primary Examiner* — Matthew Daniels
*Assistant Examiner* — Russell Kemmerle, III
(74) *Attorney, Agent, or Firm* — Tiajoloff and Kelly LLP

(57) ABSTRACT

The invention relates to a method allowing cost-effective production of doped quartz glass, particularly laser-active quartz glass, that is improved with regard to the homogeneity of the doping material distribution, in that a suspension is provided comprising $SiO_2$ particles and an initial compound for at least one doping material in an aqueous fluid, the fluid being removed under formation of a doped intermediate product comprising particles of the doping material or particles of the precursor substance or the doping material, and the doped quartz glass is formed by sintering the doped intermediate product, wherein at least part of the particles of the doping material or the particles of the precursor substance of the same is generated in the suspension as a precipitate of a pH-value-controlled precipitation reaction of the initial compound.

28 Claims, 1 Drawing Sheet

(56) References Cited

U.S. PATENT DOCUMENTS

| | | | |
|---|---|---|---|
| 4,113,658 A | * | 9/1978 | Geus .............................. 502/242 |
| 4,537,866 A | * | 8/1985 | Gilson ............................ 502/70 |
| 5,204,401 A | * | 4/1993 | Anderson et al. .............. 524/441 |
| 2004/0120884 A1 | * | 6/2004 | Sherman ....................... 423/608 |
| 2005/0233886 A1 | | 10/2005 | Andersen |
| 2006/0001952 A1 | | 1/2006 | Janka et al. |
| 2009/0215606 A1 | | 8/2009 | Gini et al. |

OTHER PUBLICATIONS

Rabinovich, E.M. et al., Multicomponent Glasses from Particulate Gels, Journal of Non-Crystalline Solids, North-Holland Physics Publishing. Amsterdam, NL, vol. 160, No. 1/02, Jul. 4, 1993, pp. 126-143.

* cited by examiner

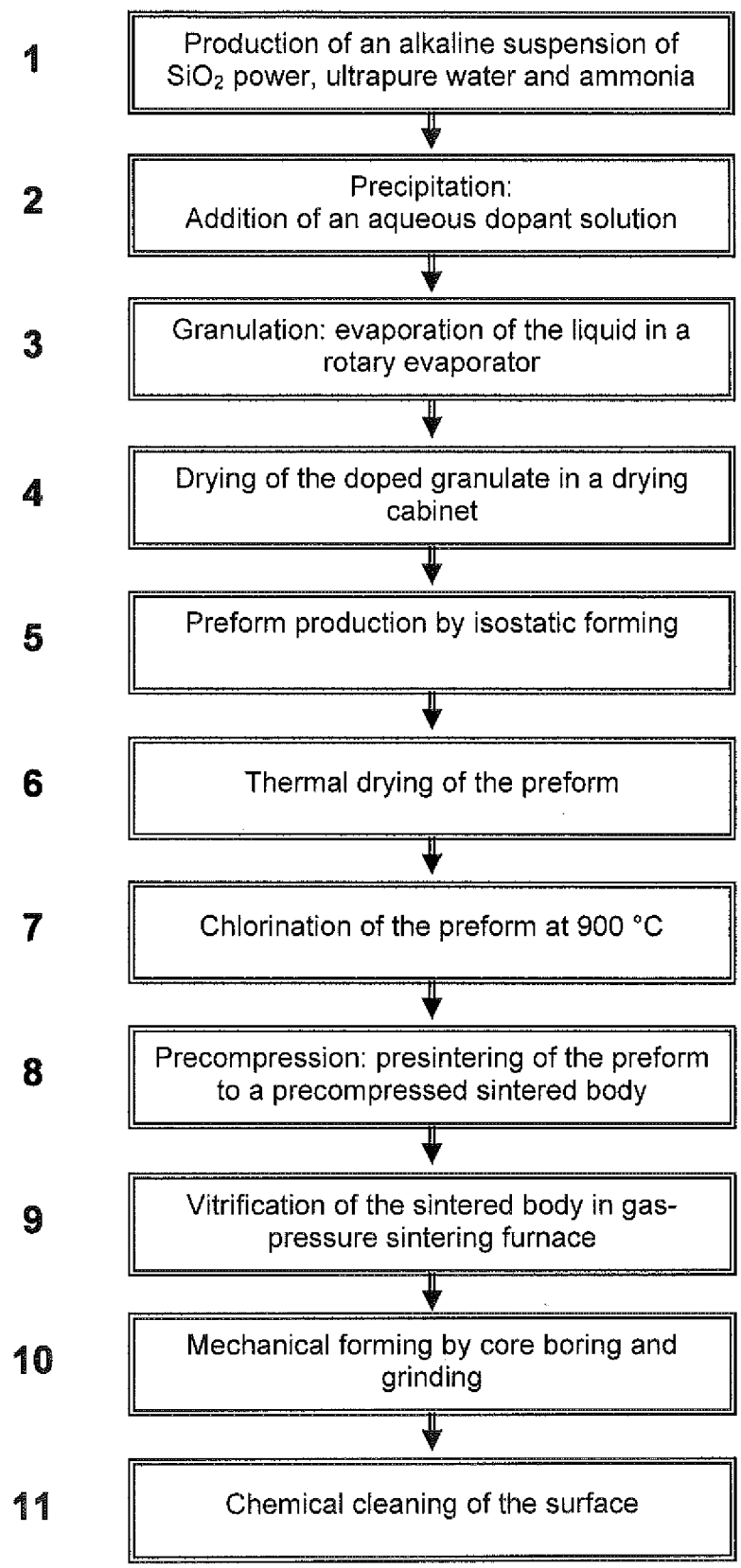

METHOD FOR PRODUCING DOPED QUARTZ GLASS

The present invention relates to a method for producing doped quartz glass in that a suspension is provided which comprises $SiO_2$ particles and an starting compound for at least one dopant in an aqueous liquid, the liquid is removed under formation of a doped intermediate product comprising particles of the dopant or particles of a precursor substance of the dopant, and the doped quartz glass is formed from the doped intermediate product by way of sintering.

PRIOR ART

Such a method is described in DE 10 2004 006 017 A1 for the manufacture of laser-active quartz glass. For doping the quartz glass with oxides of rare-earth or transition metals, a "power route" is suggested using a homogeneously doped $SiO_2$ granulate of high purity. An aqueous suspension is started from that contains $SiO_2$ nanoparticles and dopants. The suspension is granulated by gradual removal of water. The resulting spherical porous grains of doped $SiO_2$ are dried and fused by using a gas-pressure sintering method to obtain a blank of the doped laser-active quartz glass. According to one embodiment a laser-active quartz glass doped with $Al_2O_3$ and $Nd_2O_3$ is produced. An aqueous slip is started from, which contains nanoscale $SiO_2$ particles produced by means of a precipitation reaction and has added thereto starting compounds for said dopants in the form of water-soluble hydrate compounds $AlCl_3 \times 6H_2O$ and $NdCl_3 \times 6H_2O$. A laser-active quartz glass doped with $Al_2O_3$ and $Yb_2O_3$ is produced in a similar way.

However, it has been found that with the known method an adequately homogeneous distribution of the dopants cannot be achieved without difficulty, and the further processing for obtaining a low-attenuation laser fiber is not reproducible in an appropriate way. Dopant conglomerates are formed that in the fiber drawing process cause the formation of nodules, which leads to fiber breakage or to an unacceptably high optical attenuation.

It is known that doped quartz glass can be produced with a very homogeneous dopant distribution by means of CVD methods. However, in these processes the choice of dopants is restricted to those for which highly volatile starting compounds are given that can be deposited through the gas phase. This precondition is not satisfied for many elements selected from the group of rare earths and the transition metals that are used as dopant in laser-active quartz glass. During hot chlorination losses in dopant may occur.

A method variation has also been suggested in which a porous $SiO_2$ layer deposited by means of CVD methods is subsequently impregnated with a solution containing rare-earth compounds. The $SiO_2$ layer impregnated in this way is then vitrified. The method is however time-consuming and only suited for making doped quartz glass bodies having small dimensions.

A further process for making laser-active quartz glass is described in WO 2006/003253 A1. A solution containing the dopant is evaporated or atomized and passed into a deposition burner. In the burner flame doped $SiO_2$ particles are formed that are deposited on a substrate and vitrified. The formation process, however, is very slow because only a fraction of the $SiO_2$ particles is vitrified. Therefore, the manufacture of rare earth-doped quartz glass is also time-consuming and cost-intensive.

For the manufacture of preforms for optical applications, methods are frequently used that are based on the so-called sol-gel process. These methods guarantee high purity, but often require long process times. The sol-gel process is based on a polycondensation reaction and leads to the formation of very fine particles that form a network and can also exhibit a homogeneous dopant distribution. However, the further processing of the material produced in this way so as to obtain a dense bubble-free quartz glass poses problems because of the large surface so that the necessary standards for the material are often not satisfied.

For instance, EP 0 281 282 A1 suggests for the manufacture of a fluorine-doped quartz glass via the "sol-gel route" that $NH_4F$, which is added to an ammoniacal TEOS solution with a pH of 11, should be used as the starting compound for the dopant. The polycondensation reaction yields a $SiO_2$ body doped with 1% by wt. of fluorine.

In the sol-gel process known from WO 2007/017454 A1 for making an aluminum-doped quartz glass via the "sol-gel route", a porous aquagel is obtained in an intermediate step. Subsequently, a liquid containing the dopant in the form of a dissolved salt $Al(OH)_3 \times 9H_2O$ is added by circulation to the aquagel. Due to the addition of ammonia the pH of the liquid is 5, which effects an immobilization of the dopant in the porous aquagel.

TECHNICAL OBJECT

It is therefore the object of the present invention to indicate an economic method for producing doped quartz glass, particularly laser-active quartz glass, which is improved with respect to the homogeneity of the dopant distribution.

Starting from a method of the aforementioned generic type, this object is achieved according to the invention in that at least part of the particles of the at least one dopant or of the particles of the precursor substance thereof is generated in the suspension as a precipitate of a pH-controlled precipitation reaction of the starting compound.

The doped quartz glass according to the invention contains at least one dopant in a distribution that is as homogeneous as possible. To achieve this, a suspension is started from in the manufacture of the doped quartz glass that, apart from $SiO_2$ in the form of discrete amorphous particles contains at least one starting compound for the at least one dopant or of a precursor substance thereof. The "starting compound" contains the dopant or several dopants or a precursor substance. In the simplest case the starting compound is the dopant itself or the precursor substance thereof.

The method according to the invention is a development of a "suspension method" in which previously produced discrete $SiO_2$ solid particles are started from that are present in a homogeneously distributed form in an aqueous suspension, and the size of which does not considerably change in the suspension (except for milling). The use of previously produced $SiO_2$ solid particles permits an economic manufacture of doped quartz glass (in contrast to the so-called "sol-gel method").

The expression previously produced "discrete particles" stands for both $SiO_2$ individual particles and porous $SiO_2$ particle aggregates that consist of primary particles grown together. At any rate what is of importance to a homogeneous distribution of the dopant is the feature that the "discrete particles" are freely accessible within the suspension, thereby permitting an unhindered exchange of material. In porous aggregates consisting of $SiO_2$ primary particles this is e.g. ensured whenever the primary particles are spherical nano-particles, as are e.g. obtained in CVD deposition methods. The sizes of the primary particles range from 5 nm to 300 nm and are typically less than 100 nm. The mean sizes of the porous $SiO_2$ particle aggregates formed therefrom are in the range of 1 µm to 200 mm, typically around 10 µm.

The essential difference with respect to the "suspension method" described at the outset lies in the way of providing and producing the dopant particles in the suspension. In the known method the suspension is fed with starting compounds of the dopants in soluble form. Due to the fact that the respective solubility product is exceeded during drying of the suspension, dopants or their precursor substances will gradually precipitate. As a result, however, the precipitates precipitate as undefined products and rather at random locally. Moreover, non-precipitated ions cannot diffuse into porous $SiO_2$ particles, so that in the final analysis a non-homogeneous dopant distribution is obtained. By contrast, in the method of the invention the dopant particles (or particles of the precursor substance) are formed due to a precipitation reaction that is controlled by the pH of the suspension. The pH of the suspension is either set such that upon addition of the starting compounds the precipitation reaction immediately sets on, so that solid particles of the dopants (or of precursor substances) are formed in the suspension, or the pH of the suspension is changed such that starting compounds of the dopants dissolved in the suspension at the beginning are precipitated in particle form.

As a rule, precipitation effects the formation of particularly fine particles of the dopant (or of its precursor substance) in the suspension, which is on the one hand conducive to the homogeneity of the dopant distribution and on the other hand helps to stabilize the suspension. It is here essential that the dopant particles in the still liquid suspension assume a homogeneous and defined shape and can be adsorbed directly on the existing, discrete and homogeneously distributed $SiO_2$ particles and thereby immobilized.

As a consequence, even after removal of the liquid, the dopant is present in a fine homogeneous distribution in the intermediate product. To prevent sedimentation or agglomeration of dopant particles, the suspension is stabilized after start of the precipitation reaction, e.g. by way of continuous movement.

The "dopant" comprises at least one substance that is intentionally added to the quartz glass for achieving desired properties. "Precursor substance" of a dopant means in this case a substance that at a later stage of the method is converted due to chemical reaction or by changing its oxidation state into the dopant proper. Insofar as the word "dopant" is used hereinafter, said term shall also comprise a "precursor substance" for the sake of simplicity unless something different is expressly stated or if this follows from the circumstances.

"Quartz glass" means a highly siliceous glass with a $SiO_2$ portion of at least 70% by wt. in the present context.

The $SiO_2$ particles of the suspension are present in undoped or doped form. In the case of pre-doped $SiO_2$ particles a homogeneous distribution of the dopants must be ensured. This can e.g. be accomplished by way of the standard CVD methods by means of flame hydrolysis or oxidation of starting compounds containing Si and the dopant; for economic reasons this method can only be realized without difficulty for the pre-doping of selected dopants such as Cl, F, B, P, Ge, Sn, or Ti, as has been stated at the outside.

The starting compound is added to the suspension in dissolved form as a rule. Instead of supplying the starting compound to the suspension and of producing the precipitate in the suspension, a kinematic reversal is also possible wherein the suspension is fed to the dissolved starting compounds, and the precipitate is generated in the solution of the starting compound. This variant of the method is however not preferred. Depending on the type of the drying process, the intermediate product resulting from the suspension is obtained as a solid in the form of finely divided $SiO_2$ powder, as $SiO_2$ granulate composed of agglomerates of finely divided $SiO_2$, or as a porous $SiO_2$ green body.

For producing the doped quartz glass the method according to the invention employs a "suspension method" modified in comparison with the prior art and showing a defined solution, precipitation and immobilization of the dopants on the previously produced discrete $SiO_2$ particles, which avoids, on the one hand, the drawbacks of the known method with respect to inhomogeneous dopant distribution and nodule formation during fiber drawing and exploits, on the other hand, the advantages thereof in terms of economy and variable design.

The method is particularly suited for producing doped quartz glass, where the demands made on the homogeneity of the dopant distribution are very high. This is in general the case with applications in the optical sector. Quartz glasses for passive optical waveguides, laser glasses and filter glasses should here be mentioned by way of example. Furthermore, the method according to the invention is also suited for making doped quartz glass with particular electrical or magnetic properties, for producing so-called "stress rods" for use in preforms for polarization-maintaining optical fibers or for producing quartz glass of a predetermined thermal expansion coefficient, such as a "zero-expansion glass".

A main application for the method according to the invention is the manufacture of laser-active quartz glass. Said glass contains dopants effecting an amplification of laser radiation in the host material quartz glass. As a rule, rare-earth cations (lanthanides) and/or cations of the so-called transition metals are here concerned. Further dopants, such as aluminum, phosphorus and boron, are often introduced for adjusting the viscosity and the refractive index of the quartz glass. Particularly high demands are here made on the homogeneity of the dopant distribution to avoid devitrification and nodule formation and to simultaneously achieve an amplification performance as high as possible and a low attenuation of the laser radiation to be amplified.

Especially for the last-mentioned application a quartz glass is normally needed that contains two or more dopants. For the manufacture of such a co-doped quartz glass a modification of the method according to the invention has turned out to be particularly advantageous, wherein the suspension is fed with an starting compound for a first dopant and with an starting compound for a second dopant, wherein at least part of the particles of the first dopant and of the second dopant or of the particles of precursor substances thereof is generated in the suspension as a precipitate of the precipitation reaction of the starting compounds, and wherein the liquid is removed under formation of a co-doped intermediate product containing particles of the dopant and particles of the second dopant or particles of precursor substances of the dopants, and the co-doped quartz glass is formed from the co-doped intermediate product by way of sintering.

It is here also important that the particles of the dopants (or of the precursor substances thereof) are present in a homogenous and defined form in the liquid suspension and are directly adsorbed on the existing $SiO_2$ particles and thereby immobilized. As a result, even after removal of the liquid, the dopants are present in a fine homogeneous distribution in the intermediate product composed of doped $SiO_2$. A homogeneous distribution of the dopants is thereby achieved in the sintered quartz glass.

For making co-doped quartz glass a method variant has turned out to be useful wherein the suspension is first homogenized without the dopants and the homogenized suspension is subsequently fed with starting compounds of first and second dopant in dissolved form, wherein the pH-controlled precipitation reaction is induced as a mixed precipitation in that the pH of the suspension is adjusted such that upon addition of the starting compounds particles of the first dopant and particles of the second dopant (or of the precursor compounds thereof) precipitate immediately.

The starting compounds of the dopants are here supplied to the suspension in the form of one or several dopant solutions. The supply in a single dopant solution should be given preference on condition that the starting compounds of the dopants can be dissolved together. The pH of the suspension is set such that with a simultaneous addition of the starting compound of first and second dopant the precipitation reaction sets in immediately for both dopants. In this "mixed precipitation" the dopant of high solubility and the dopant of low solubility are precipitated at the same time and jointly, whereby mixed compounds, e.g. mixed hydroxides which are adsorbed on the $SiO_2$ particles, are ideally formed. This yields a particularly homogeneous distribution of the dopants and a defined and homogenous precipitate even if the solubility products of first and second dopant are clearly different. The starting compounds for the first and second dopant can also be provided in the form of a joint chemical compound.

Advantageously, an aqueous suspension is provided, homogenized and set to a pH above 7, preferably above 9.

The pH of the suspension is shifted into the alkaline range, as a rule by adding adjuvants, and kept in said range. The pH is set to be alkaline in such a way that after addition of the starting compounds for the dopants, compounds of low solubility ("insoluble" compounds), such as hydroxides, carbonates or phosphates, are directly formed each time. If necessary, the suspension must contain suitable precipitants, such as ammonium carbonate or ammonium carbamate, which are both particularly suited for instance for a combined precipitation of carbonates and hydroxides. The higher the pH of the suspension is set, the more probable is the case that the solubility product of the respective compounds of low solubility is exceeded, and the more likely is the desired mixed precipitation. Moreover, a suspension of $SiO_2$ particles at such a pH shows a high stability because interparticulate repelling forces between the $SiO_2$ particles counteract sedimentation.

At very high pH values above 12, as can be set by means of alkali hydroxides, the solubility products of compounds that are per se difficult to dissolve can however be fallen short off again. Moreover, very high pH values call for the use of substances that would lead to undesired contamination of the co-doped quartz glass. Therefore, the pH of the suspension is preferably kept at not more than 12, particularly preferably not more than 10, the pH of the suspension being adjusted and changed by adding alkali-free acids or bases.

The use of alkali-free acids or bases for setting the pH ensures a load as small as possible on the quartz glass to be produced by contamination and crystal promoters.

In this respect it has turned out to be particularly useful when nitrogen hydrides, particularly ammonia, ammonium salts, hydrazines or amines, such as hydroxylamine, are used as the alkali-free base.

Ammonia acts as a moderately strong base and allows a pH of not more than about 10 in aqueous solution which is enough for forming hardly soluble hydroxide compounds of the standard dopants.

When the starting compound is added, the pH of the suspension may change. To compensate for such a change, particularly to counteract an excessively strong decline in the pH, it has turned out to be useful when the pH of the suspension is held or adjusted during supply of the dissolved starting compound by adding an adjuvant.

In this context it has also turned out to be advantageous when the suspension contains an excess amount of ammonia that helps to buffer the pH.

As an alternative, or in addition, the volume of the dissolved starting compound can be kept as small as possible; preferably, the volume ratio of the solution of the starting compound to that of the suspension is less than 1.

Moreover, it has turned out to be advantageous when upon addition of the starting compounds the liquid content of the suspension is increased by adding water, ammonia and/or aqueous solutions.

As a result of the precipitation reaction the solids content of the suspension rises rapidly. The dilution of the suspension by adding further liquid, particularly in the form of water, ammonia and/or aqueous solutions, contributes to the stabilization of the suspension and helps to avoid premature gelation.

When the starting compound is supplied to the suspension, a local oversaturation with the starting compound and thus an inhomogeneous precipitation may occur. To counteract such a situation, a procedure is preferred in which the suspension is mechanically moved while the starting compound is added.

Due to the continuous movement at least at the initial stage of the precipitation process, preferably during the whole precipitation reaction and beyond that reaction, the distribution of the precipitate becomes more homogeneous and sedimentation is avoided. The suspension is here moved by means of one of the known and appropriate methods, such as stirring, swirling, shaking, or by the use of ultrasound.

In this context it has turned out to be particularly advantageous when the starting compound is present in a solution which is supplied to the suspension drop by drop, with the suspension being mechanically moved before each addition of a drop.

The addition of the dissolved starting compound or of the dissolved starting compounds is here not carried out continuously, but drop by drop, preferably in time-controlled fashion according to predetermined time intervals. The extent of the mechanical movement of the suspension and the time interval between the drops are here matched such that each drop passes into a suspension that is as homogeneous as possible. It has been found that a particularly homogeneous distribution of the dopant or of the dopants is thereby accomplished.

As an alternative or in addition, it has turned out to be advantageous that the suspension and the starting compound are combined through a flow-rate controlled supply into a reaction chamber.

This is a continuous procedure that permits high productivity together with constant quality. The reaction chamber is preferably a flow reactor in which even small amounts of the reactant can be combined in a defined way and reacted.

The suspension preferably contains water and at least one further adjuvant. Owing to the addition of adjuvants, preferably nitrogen hydrides, such as $NH_3$, $(NH_4)_2CO_3$, ammonium carbamate, amine, hydroxylamine, hexamethylene tetramine, hydrazine, ammonium acetate or organic solvents, the pH of the suspension can be adjusted on the one hand and other properties of the suspension, such a surface tension, viscosity or suspension stability, can be improved by adding adjuvants, which has an advantageous effect on a homogeneous distribution of the dopant.

In an alternative and equally preferred variant of the method according to the invention, the pH-controlled reverse precipitation is induced in that the pH of the suspension is set to a first lower value, with the starting compound of the at least one dopant being dissolved in the suspension, and that subsequently the pH of the suspension is raised to a second higher value, with particles of the dopant (or of the precursor compound thereof) being precipitated.

An advantage of this procedure is that the dissolved starting compound of the dopant is distributed in a particularly homogeneous way throughout the suspension and particularly also in possible porous $SiO_2$ particles or in $SiO_2$ particle aggregates. This permits a particularly homogeneous distribution of the starting compounds in the suspension before the introduction of the precipitation reaction by increasing the pH. Due to the increase in the pH of the suspension the at least one dopant will precipitate.

For producing co-doped quartz glass a method variant of the reverse precipitation is preferred wherein starting compounds of a first dopant and of a second dopant are dissolved in the suspension adjusted to a first lower pH, and that subsequently the pH of the suspension is raised to a second higher value, with particles of the first dopant and particles of the second dopant (or of the precursor compounds thereof) being precipitated.

Depending on the specific solubility product of the dopant, there may be a time-graded, a temperature-graduated or a simultaneous precipitation of the dopants. The pH can here be increased by adding a base to the suspension. However, the addition of the base may effect a local oversaturation and an intensified precipitation and thus an inhomogeneous dopant distribution.

This drawback is avoided in a preferred variant of the method in which the pH is raised by increasing the temperature of the suspension in that a compound acting at a lower temperature in the suspension as an acid is decomposed by increasing the temperature with release of a substance acting as a base in the suspension.

Ideally, the thermal decomposition of the compound acting as an acid takes place at the same time and uniformly within the volume of the suspension. Local oversaturations and accompanying differences in the concentration of the dopant distributions are thereby avoided.

Hexamethylene tetramine is preferably used as the compound acting as an acid at the lower temperature in the suspension.

Hexamethylene tetramine (urotropine) is a condensation product of ammonia and formaldehyde. At room temperature an aqueous suspension of hexamethylene tetramine shows an alkaline pH which can be set to about 5 by adding a system-buffering acid, such as $NH_4Cl$, so that hydroxides or other hardly soluble compounds of most dopants cannot precipitate. Upon heating ammonia is released, whereby the pH is increased, resulting in a uniform precipitation of the dopants in the form of hydroxide compounds or other precipitation products.

The method of the invention is particularly suited for making doped quartz glass for use in laser-active optical components, such as optical waveguides. It has here turned out to be useful when one or several rare-earth oxides, particularly ytterbium oxide, is used as the dopant.

As an alternative or in addition, fluorine or one or several oxides of the following group of elements can used as co-dopant: Al, B, P, Nb, Ta, Mg, Ga, Zn, Ca, Sr, Ba, Sc, La, Sb, Ge, Y, Ce, Hf, Zr and Ti.

The term "rare earths" covers the lanthanides (including lanthane) as well as Sc and Y in this context. For such dopants the skilled person will easily find starting compounds and solvents suited therefor. Chlorides, such as $YbCl_3$ and $ErCl_3$ and ammonium niobium oxalate should here be mentioned as examples. The co-dopant or the co-dopants serve to improve or adapt the mechanical and optical properties of the doped quartz glass, e.g. refractive index, viscosity, devitrification tendency, bubble formation, thermal expansion coefficient, material homogeneity, optical material attenuation, induced attenuation by material damage, optical absorption properties, transmission, fluorescence service life, material aging, or photodarkening.

The skilled person easily finds starting compounds and solvents suited therefor also for the oxides mentioned as co-dopants, $AlCl_3$, $(NH_4)_2B_4O_7 \times 4H_2O)$, $H_3PO_4$, HF, $NH_4F$, should here be mentioned as examples.

The dopant concentrations of the oxides of the rare earth metals, of boron and of aluminum may amount to 20% by wt. The dopant concentrations of the other indicated dopants are typically less than 5% by wt.

With respect to a homogeneous precipitation reaction it has turned out to be advantageous when the solids content of the suspension in the precipitation of the at least one dopant is less than 80% by wt., preferably less than 70% by wt.

A small solids content and the accompanying low viscosity of the suspension contribute to a rapid and uniform distribution of the starting compound in the suspension and of the precipitate formed therefrom. Solids contents of less than 40% by wt. are not preferred for the reason that a homogeneous dopant distribution in the suspension is rendered difficult in the comparatively large volume. In the case of a temperature-controlled precipitation the setting of a uniform temperature distribution within the larger volume is moreover rendered difficult. High dilutions are moreover also not preferred for economic considerations.

After the completion (or already during) the precipitation reaction, liquid is removed from the suspension (drying). The reduction of the liquid content in the suspension is here carried out preferably as fast as possible, so that sedimentation and the formation of a distribution gradient of the precipitate are avoided, for instance by freeze-drying or by means of a granulator.

It has turned out to be useful when prior to sintering of the doped $SiO_2$ intermediate product the intermediate product is compressed in a compression atmosphere at a temperature below the sintering temperature.

Due to the pre-compression of the co-doped intermediate product the influence of the atmosphere in subsequent hot treatment processes is minimized. For instance, it may happen that during sintering and due to the process a sintering atmosphere must be set that reacts with the dopant and would have a disadvantageous impact on the oxidation state of said dopant or its distribution in the intermediate product. This influence of the sintering atmosphere can be prevented by way of full encapsulation of the intermediate product or preferably in that the intermediate product is provided in the form of a porous bulk powder or a porous green body with a compressed outer region, the compressed outer region being produced at a lower temperature and under a compression atmosphere that does not have a negative effect on the dopant and the distribution thereof.

For instance, when laser-active quartz glass is doped with ytterbium oxide, it is often desired that ytterbium is present as $Yb^{3+}$, and not in a reduced form of divalent $Yb^{2+}$, because in the last-mentioned case a strong increase in attenuation and a limited service life of the fluorescence transition that is important for laser application are observed. Due to the compression of the outer region of the still porous intermediate product prior to sintering under an oxidizingly acting compression atmosphere the dopant ytterbium oxide can be brought into the trivalent oxidation state, and the compressed outer region of the intermediate product provides protection against an atmosphere of a possible reducing action during sintering.

The liquid is removed prior to introduction (hereinafter also referred to as "drying) with the help of the known methods, such as using a rotary evaporator, a granulator, a freeze drier, a microwave drier, or a suction or membrane mold. Drying may be accomplished with a shift in the pH and may lead to an agglomeration of the dopant particles. The result of the drying process is an intermediate product in the form of $SiO_2$ powder, $SiO_2$ granulate or a $SiO_2$ green body that contains the at least one dopant or a precursor substance thereof in finely distributed form and in a uniform distribution.

In a preferred variant of the method drying of the suspension is preceded by a method step in which solids contained in the suspension and the liquid are separated by means of a mechanical separation method.

The mechanical separation of solid and liquid is carried out in the simplest case by way of centrifugation. This can prevent a precipitation of dissolved adjuvants that would otherwise pass into the doped $SiO_2$ solid during drying and have a negative effect on the subsequent method steps. $NH_4Cl$ should here especially be mentioned, which can lead to a loss in dopant by forming volatile metal chlorides at high temperatures.

The dissolved adjuvants remain dissolved in the separated liquid and are removed with said liquid. This "washing procedure" can be repeated several times. Subsequently, the solid phase is again passed into a homogeneous suspension and dried with formation of the doped $SiO_2$ solid. This variant of the method turns out to be particularly useful at high dopant concentrations to avoid dopant losses.

Advantageously, the $SiO_2$ particles have particle sizes ranging from 0.5 μm to 100 μm, preferably from 1 μm to 10 μm.

The discrete amorphous $SiO_2$ particles that are present in the suspension and have particles sizes in the order of from 0.5 μm to 100 μm are on the one hand large enough to enable an economic manufacture of quartz glass and are on the other hand small enough to ensure a homogeneous distribution of the dopant.

$SiO_2$ particles that are present as aggregates of $SiO_2$ primary particles have turned out to be particularly advantageous, the $SiO_2$ primary particles in the range between 5 nm and 300 nm accounting for the largest volume fraction.

Discrete amorphous $SiO_2$ particles in the form of particle aggregates can be adjusted in their size and density such that an economic manufacture quartz glass is possible on the one hand and an unhindered exchange of material in the suspension towards the primary particles on the other hand. The unhindered exchange of material ensures a homogeneous distribution of the dopant. Such particles are characterized by a specific (BET) surface area in the range of from 10 $m^2/g$ to 500 $m^2/g$; preferably, the BET surface area is in the range of 30 $m^2/g$ to 70 $m^2/g$. The particle size distribution is preferably characterized by a $D_{50}$ value of less than 50 nm. The particle sizes of the aggregates are preferably in the range between 1 μm and 30 μm.

Moreover, it has turned out to be useful when at least 80% by wt., preferably at least 90% by wt., of the $SiO_2$ primary particles are made spherical.

Spherical particles help to set a high solids density, so that stresses during drying and sintering of the intermediate product are avoided. Ideally, all of the $SiO_2$ primary particles are made spherical.

The use of $SiO_2$ particles consisting of $SiO_2$ produced by CVD methods has turned out to be particularly useful.

These synthetically produced $SiO_2$ particles are characterized by high purity. The degree of contamination of the resulting quartz glass is here less than 1 wt. ppm.

The intermediate product is further processed by means of methods, as are also standard and suited in the further processing of powder, granulate or green body. Suitable methods comprise:

Drying the intermediate product in a drying cabinet or furnace, wherein highly volatile compounds, such as $NH_4Cl$, are decomposed or sublimed and removed from the intermediate product.

Pressing granulate or powder to obtain a compact which is thereafter further treated like a $SiO_2$ green body.

Further drying and cleaning of the intermediate product in a reactive atmosphere, such as chlorine, oxygen or hydrogen containing reactive atmosphere or in vacuum.

Vitrifying granulate or green body in the flame melt or in the gas-pressure sintering furnace. In the case of flame vitrification the intermediate product may be surrounded by an evacuated cladding tube to avoid a situation where evaporating particles pass into the environment or, inversely, impurities pass from the environment into the intermediate product to be vitrified. During vitrification in the gas-pressure sintering furnace the intermediate product may be surrounded by a bulk material of quartz glass grains. The quartz glass grains serve as a protective jacket for the intermediate product against the furnace atmosphere of a normally reducing action in the gas-pressure sintering furnace, and help to avoid interactions between the intermediate product and the graphite of the furnace. This prevents bubble formation, discoloration and crystallization in the doped quartz glass. The bulk mass may consist of undoped quartz glass grains or of doped quartz glass grains and may have a gradient of the dopant concentration in radial direction so as to reduce stresses arising during vitrification. The less-doped regions can also be present in the form of less doped outside regions of the green body or may additionally be introduced into less-doped granular bulk masses. As has already been explained further above in connection with a flame vitrification of the green body in the gas-pressure sintering furnace, the green body can also be overclad or enclosed by a cladding tube before so as to reduce the gas exchange between green body and the furnace atmosphere of the reducing furnace action during vitrification in the gas-pressure sintering furnace. The result of the vitrification process is a body of doped quartz glass according to the present invention.

A mechanical further processing of the quartz glass body, e.g. by grinding by means of a peripheral grinder or by drilling by means of a drill or a core bit. The result of the mechanical further processing is a mechanically treated quartz glass body, e.g. a doped quartz glass rod which can subsequently be further processed in a plasma coating process to obtain a fiber preform.

A mechanical polishing or a hot polishing and/or a chemical cleaning of the surface of the mechanically treated quartz glass body to reduce impurities in the surface.

A hot homogenizing process by three-dimensional deformation of the quartz glass body to further improve the homogeneity of the material.

The quartz glass body in rod form can be clad with tubes of undoped or doped quartz glass to produce a rod laser preform or a fiber preform. Furthermore, the quartz glass body can be used in rod or tube form to produce a microstructured fiber with the properties of photonic crystal fibers therefrom. Furthermore, the quartz glass body in rod form can be directly drawn in the fiber drawing tower into the fiber and coated by way of a suitable coating at a low refractive index.

EMBODIMENT

The invention shall now be explained in more detail with reference to embodiments and a drawing. As the sole FIGURE, FIG. 1 shows a block diagram with method steps for explaining the production of doped quartz glass according to the invention with reference to an embodiment To produce a quartz glass doped with $Yb_2O_3$ and $Al_2O_3$, a suspension of discrete $SiO_2$ particles is prepared in the form of $SiO_2$ aggregates in ultrapure water. The $SiO_2$ aggregates have a mean particle size of around 10 μm and they are made of $SiO_2$ primary particles having particle sizes in the range of 5 nm to 100 nm. Due to the addition of a concentrated ammonia solution a pH of 9.5 was set (1). The solids content of the alkaline suspension was 50% by wt.

The homogenized alkaline suspension was fed with dopants in dissolved form and by time-controlled dropwise addition of an aqueous dopant solution consisting of $AlCl_3$ and $YbCl_3$ (molar ratio 4:1) with constant stirring (2). The time interval between successively added drops of the dopant solution was set to one second, whereby it was ensured that each drop passed into an already sufficiently homogenized suspension.

The high pH value of the suspension directly yields a mixed precipitation of hydroxides of the two dopants in the form of $Al(OH)_3$ and $Yb(OH)_3$. The solid particles formed in this way adsorb on the existing surfaces of the $SiO_2$ particles and are thereby immobilized so that a coagulation of the solids particles or sedimentation is prevented. A dopant concentration of 2 mol % Al and 0.5 mol % Yb (based on the Si content of the suspension) is thereby set.

The volume fraction of the dopant solution is 20% of the initial volume of the suspension. During doping the previously set pH of the suspension is kept constant through an excess amount of ammonia in the suspension and, if necessary, by further addition of ammonia and ultrapure water so as to avoid dissimilar conditions in the chemical precipitation of the doping agents and a gelation of the suspension. The hydroxide compounds of the doping agents are thereby homogeneously distributed in the suspension. The suspension was stirred continuously.

Subsequently, the suspension provided with the dopant is granulated in a rotary evaporator (3). Moisture was removed from the suspension very rapidly by the action of heat. Hence, the porous $SiO_2$ granulate produced in this way contained finely and homogenously distributed $Al(OH)_3$ and $Yb(OH)_3$ particles in an amount which in oxidic form effects a doping of the quartz glass with 1 mol % $Al_2O_3$ and 0.25 mol % $Yb_2O_3$.

The doped $SiO_2$ granulate was pretreated at 200° C. for a period of 24 h in an oxygen atmosphere (4). Residual moisture and $NH_4Cl$ which at an elevated temperature may lead to losses in dopant due the formation of volatile metal-chloride compounds were removed. Subsequently, the granulate was isostatically processed at a pressure of 100 MPa (5). The compacts produced in this way were thermally dried in a drying cabinet (6) and then exposed at a temperature of 800° C. to a chlorine-containing atmosphere for 5 hours (7). Subsequently, the compacts were presintered at 1600° C. in the same furnace in a He atmosphere (8). The resulting white precompressed sintered bodies were formed with a relatively dense outer skin.

Example 1

Part of the precompressed sintered body was vitrified in the gas-pressure sintering furnace in an atmosphere showing a reducing action (9). To this end the precompressed sintered bodies were first heated in vacuum to 1740° C. and then vitrified at the same temperature at a pressure of 1.5 MPa. Core rods with a length of 20 cm and a diameter of 15 mm were drilled out of the glass bodies of transparent quartz glass formed thereby (10). An F-doped quartz glass was built up as cladding glass by means of a plasma coating process on the core rods that had been cleaned by etching in HF solution before (11) and a laser fiber preform was thereby produced. Said preform was subsequently further processed in the fiber drawing tower to obtain a laser fiber. The laser fiber obtained thereby showed laser activity.

Example 2

Another part of the precompressed sintered body was vitrified on a glass maker's lathe by zonewise melting with an oxyhydrogen gas burner at a temperature of about 2200° C. to obtain a transparent quartz glass rod having a length of 20 cm and a diameter of 20 mm.

After cleaning of the surface by flame polishing the quartz glass rod was overclad with a fluorine-doped quartz glass tube obtainable under the name "F320" from the company Heraeus Quarzglas GmbH & Co. KG, Hanau. The fiber preforms produced in this way were drawn into active laser fibers having a core diameter of 150 μm and a fiber diameter of 180 μm, and simultaneously coated in this process with a coating of UV curable acrylate with a smaller refractive index, the outer diameter of which is 205 μm.

For IR radiation of a wavelength of 1200 nm a basic attenuation of about 50 dB/km was determined for this fiber, which permits its use as a fiber laser material.

Precompressing so as to obtain a sintered body according to method step (8) and vitrifying according to method step (9) can also be carried out in one process in the gas-pressure sintering furnace.

The invention claimed is:
1. A method for producing quartz glass doped with a first and second dopant, said method comprising:
providing a suspension that comprises $SiO_2$ particles in an aqueous liquid;
supplying to the suspension a starting compound for the first dopant and a starting compound for the second dopant, wherein the starting compounds of the first and second dopants are added to the suspension in dissolved form;
generating particles of, or particles of precursor substances of, the first and second dopants in the suspension as a precipitate of a precipitation reaction of the starting compounds;
removing the liquid so as to form a co-doped intermediate product containing particles of the first dopant or particles of a precursor substance of the first dopant and particles of the second dopant or particles of a precursor substance of the second dopant;
forming the co-doped quartz glass from the co-doped intermediate product by sintering;

wherein the suspension has a pH, and the precipitation reaction is induced as a pH-controlled mixed precipitation; and wherein, before the supplying of the starting compounds, the pH of the suspension is adjusted such that, upon addition of the starting compounds, the particles of the first dopant and the particles of the second dopant or the particles of the precursor substances of the first and second dopants precipitate immediately.

2. The method according to claim 1, wherein the aqueous suspension is homogenized and has a pH above 7.

3. The method according to claim 2, wherein the pH of the suspension is kept at not more than 12, by adding alkali-free acids or bases.

4. The method according to claim 3, wherein the alkali-free base comprises nitrogen hydrides.

5. The method according to claim 4, wherein the suspension contains an excess amount of ammonia.

6. The method according to claim 3, wherein the alkali-free base comprises hydroxylamine.

7. The method according to claim 3, wherein the alkali-free base comprises ammonia, ammonium salts, hydrazines or amines.

8. The method according to claim 2, wherein the pH of the suspension is kept at not more than 10, by adding alkali-free acids or bases.

9. The method according to claim 1, wherein die pH of the suspension is maintained or adjusted during supply of the dissolved starting compound by adding an adjuvant.

10. The method according to claim 1, wherein upon the addition of the starting compound the liquid content of the suspension is increased by adding water, ammonia and/or aqueous solutions.

11. The method according to claim 1, wherein the suspension is mechanically stirred while the starting compounds are added.

12. The method according to claim 11, wherein the starting compounds are present in a solution and are subsequently supplied to the suspension drop by drop, while the suspension is mechanically stirred before each drop is added.

13. The method according to claim 1, wherein the precipitation reaction is induced as a pH-controlled reverse precipitation wherein the pH of the suspension is at a first value, the starting compounds of the dopants are dissolved in the suspension, and the pH of the suspension is subsequently raised to a second value higher than the first value, while the particles of the dopants or the particles of the precursor substance thereof are precipitated, wherein the co-doped quartz glass is produced by dissolving the starting compounds of the first dopant and the second dopant in the suspension and a pH thereof is adjusted to a first value, and the pH of the suspension is subsequently raised to a second higher value than the first value, while the particles of the first dopant and particles of the second dopant or particles of the precursor substances of the first and second dopants are precipitated.

14. The method according to claim 13, wherein the pH is raised by increasing the temperature of the suspension wherein a compound acting as an acid at the lower temperature in the suspension is decomposed by increasing the temperature with a release of a substance acting as a base in the suspension.

15. The method according to claim 14, wherein the compound acting as an acid at the lower temperature in the suspension is hexamethylene tetramine.

16. The method according to claim 1, wherein the one of the dopants comprises one or more rare-earth oxides.

17. The method according to claim 1, wherein the one of the dopants comprises fluorine or one or more oxides of the group consisting of the following elements Al, B, P, Nb, Ta, Mg, Ga, Zn, Ca, Sr, Ba, Sc, La, Sb, Ge, Y, Ce, Hf, Zr and Ti.

18. The method according to claim 1, wherein the solids content of the suspension in the precipitation of the dopant is less than 80% by wt.

19. The method according to claim 1, wherein the drying of the suspension is preceded by a method step of separating solids contained in the suspension as well as the liquid by a mechanical separation method.

20. The method according to claim 1, wherein prior to the sintering of the doped $SiO_2$ intermediate product, the intermediate product is compressed in a compression atmosphere at a temperature below the sintering temperature.

21. The method according to claim 1, wherein the $SiO_2$ particles have particle sizes ranging from 0.5 µm to 100 µm.

22. The method according to claim 21, wherein the $SiO_2$ particles are present as aggregates of $SiO_2$ primary particles, the $SiO_2$ primary particles ranging between 5 nm and 300 nm represent the largest volume fraction.

23. The method according to claim 22, wherein at least 80% by wt of the $SiO_2$ primary particles are spherical.

24. The method according to claim 22, wherein the $SiO_2$ particles are of $SiO_2$ produced by a CVD method.

25. The method according to claim 1, wherein the aqueous suspension is homogenized and has a pH above 9.

26. The method according to claim 1, wherein the one of the dopants comprises ytterbium oxide.

27. The method according to claim 1, wherein the solids content of the suspension in the precipitation of the dopants is less than 70% by wt.

28. The method according to claim 1, wherein the $SiO_2$ particles have particle sizes ranging from 1 µm to 10 µm.

* * * * *